US006813257B1

(12) United States Patent
Emmons, Jr. et al.

(10) Patent No.: US 6,813,257 B1
(45) Date of Patent: Nov. 2, 2004

(54) APPARATUS AND METHODS FOR CONTROLLING SHORT CODE TIMING OFFSETS IN A CDMA SYSTEM

(75) Inventors: Thomas Peter Emmons, Jr., Mesa, AZ (US); Jonathan H. Gross, Gilbert, AZ (US); Scott A. Ameduri, Phoenix, AZ (US); Michael B. Haverty, Scottsdale, AZ (US)

(73) Assignee: Motorola, Inc., Schaumburg, IL (US)

( * ) Notice: Subject to any disclaimer, the term of this patent is extended or adjusted under 35 U.S.C. 154(b) by 757 days.

(21) Appl. No.: 09/605,663

(22) Filed: Jun. 26, 2000

(51) Int. Cl.⁷ .............................................. H04B 7/216
(52) U.S. Cl. ..................... 370/335; 370/342; 370/350; 370/503
(58) Field of Search ................................ 370/342, 335, 370/350, 503; 375/140

(56) References Cited

U.S. PATENT DOCUMENTS

| | | | |
|---|---|---|---|
| 2,598,064 | A | 5/1952 | Lindenblad |
| 2,626,348 | A | 1/1953 | Nobles |

(List continued on next page.)

FOREIGN PATENT DOCUMENTS

| | | |
|---|---|---|
| EP | 0 421 704 A2 | 10/1990 |
| EP | 0 618 704a1 | 11/1994 |
| EP | 0 789 498 A2 | 8/1997 |
| EP | 0 803 742 A2 | 10/1997 |
| EP | 0 837 567 A2 | 10/1997 |
| EP | 0 939 569 A1 | 2/1998 |
| EP | 0 901 240 A1 | 3/1999 |
| FR | 2757331 | 12/1997 |
| GB | 2 320 992 A | 11/1997 |
| GB | 2318948 A | 5/1998 |
| JP | 3104426 A2 | 5/1991 |
| WO | WO 95 04407 | 2/1995 |
| WO | WO 96 02094 | 1/1996 |
| WO | WO 96 16489 | 5/1996 |
| WO | WO 97 07609 | 2/1997 |
| WO | WO 97 19525 | 5/1997 |
| WO | WO 97 23104 A1 | 6/1997 |
| WO | WO 98 51568 | 5/1998 |
| WO | WO 98 44639 | 10/1998 |
| WO | WO 99 13598 | 3/1999 |
| WO | WO 99 23769 A1 | 5/1999 |
| WO | WO 99 45609 | 9/1999 |
| WO | WO 99 46877 | 9/1999 |
| WO | WO 00 14902 | 3/2000 |

OTHER PUBLICATIONS

"Airborne Relay Communication System"—System Demonstration—public handout at public demonstration, May 1, 1998, 36 pages.

(List continued on next page.)

*Primary Examiner*—Chau Nguyen
*Assistant Examiner*—Christine Ng
(74) *Attorney, Agent, or Firm*—Charles W. Bethards; Frank J. Bogacz (57) ABSTRACT

A CDMA cellular communications network (400, FIG. 4) includes one or more aircraft (410), which relay pilot channel and control channel signals between base transceiver stations (BTS's 406, 413) and subscriber units (401). Over the control channel, the BTS transmits a handoff candidate list to the subscriber units. The handoff candidate list identifies candidate BTS's to which the subscriber unit, theoretically, could hand off. In addition, the list indicates at which offsets the subscriber units should search for short codes transmitted by the candidate BTS's over the pilot channel. Based on the path length between the BTS, aircraft, and subscriber unit, the candidate BTS's actually generate their short codes at an offset that is equal to or earlier than the offset reported to the subscriber unit by some delta. In addition, the BTS's can impose a variable delay on the generated short code bits to compensate for variations in the path delay as the aircraft flies in its flight pattern.

16 Claims, 9 Drawing Sheets

U.S. PATENT DOCUMENTS

| | | | |
|---|---|---|---|
| 2,627,021 A | | 1/1953 | Hansell et al. |
| 2,748,266 A | | 5/1956 | Boyd |
| 3,866,227 A | | 2/1975 | Ruvin |
| 5,063,387 A | | 11/1991 | Mower |
| 5,067,172 A | | 11/1991 | Schloemer |
| 5,123,112 A | | 6/1992 | Choate |
| 5,187,805 A | | 2/1993 | Bertiger et al. |
| 5,414,728 A | * | 5/1995 | Zehavi ........................ 370/342 |
| 5,455,964 A | | 10/1995 | Roos et al. |
| 5,479,482 A | | 12/1995 | Grimes |
| 5,530,909 A | | 6/1996 | Simon et al. |
| 5,548,292 A | | 8/1996 | Hirshfield et al. |
| 5,557,656 A | | 9/1996 | Ray et al. |
| 5,559,865 A | | 9/1996 | Gilhousen |
| 5,574,968 A | | 11/1996 | Olds et al. |
| 5,619,211 A | | 4/1997 | Horkin et al. |
| 5,625,867 A | | 4/1997 | Rouffet et al. |
| 5,657,032 A | | 8/1997 | Liechty et al. |
| 5,678,184 A | | 10/1997 | Cutler, Jr. et al. |
| 5,774,790 A | | 6/1998 | Dupuy |
| 5,790,939 A | | 8/1998 | Malcolm et al. |
| 5,832,380 A | | 11/1998 | Ray et al. |
| 5,890,079 A | | 3/1999 | Levine |
| 5,937,349 A | | 8/1999 | Andresen |
| 5,974,349 A | | 10/1999 | Levine |
| 6,006,084 A | | 12/1999 | Miller et al. |
| 6,018,659 A | | 1/2000 | Ayyagari et al. |
| 6,058,136 A | * | 5/2000 | Ganesh et al. ............... 375/130 |
| 6,061,561 A | | 5/2000 | Alanara et al. |
| 6,061,562 A | | 5/2000 | Martin et al. |
| 6,072,428 A | | 6/2000 | Schipper et al. |
| 6,073,004 A | | 6/2000 | Balachandran |
| 6,127,946 A | | 10/2000 | Tzidon et al. |
| 6,161,022 A | * | 12/2000 | Hwang et al. ............... 455/561 |
| 6,246,673 B1 | * | 6/2001 | Tiedemann et al. ......... 370/333 |
| 6,246,676 B1 | * | 6/2001 | Chen et al. ................. 370/342 |
| 6,272,121 B1 | * | 8/2001 | Smith et al. ................ 370/342 |
| 6,285,878 B1 | | 9/2001 | Lai |
| 6,307,840 B1 | * | 10/2001 | Wheatley et al. ........... 370/252 |
| 6,317,453 B1 | * | 11/2001 | Chang ........................ 375/140 |
| 6,324,398 B1 | | 11/2001 | Lanzerotti et al. |
| 6,381,225 B1 | * | 4/2002 | Chockalingam et al. .... 370/316 |
| 6,553,230 B1 | * | 4/2003 | Plestid et al. ............... 455/436 |

OTHER PUBLICATIONS

"Concept Overview", Angel Technologies Corporation Web Page Printout, (www.angelcorp.com), Mar. 1998, 7 pages.

"Hail Hale, the Answers May All Be Here", Thomas W. Will, Ph.D., Joseph N. Pelton, Ph.D., Unmanned Systems Magazine, Winter 1995, pp. 31–34.

"High–Capacity Aerial Vehicles Aid Wireless Communications", Signal Magazine, Apr. 1997, 6 pages.

"Geosynchronous Satellites at 14 Miles Altitude?", Joseph N. Pelton, Ph.D., New Telecom Quarterly, Second Quarter 1995 (2Q95), pp. 11–16.

"*51.84 Mbps Airborne Wireless Experiments: A Prelude to the Emerging Halo ™ Communication Technology*", IEEE 0–7803–5554–Jul. 1999, Jon Aasterud et al.

"Establishing Wireless Communications Services Via high–altitude Aeronautical Platforms: A Concept Whose Time Has Come?", Djuknic et al, IEEE Communications Magazine, Sep. 1, 1997, pp. 128–135.

"*On the Use of Hale Platforms as GSM Base Stations*", IEEE Personal Communications, Apr. 2001 vol. 8 No. 2, pp. 37–43.

"Relay Aircraft Enable Cell 'Network in the Sky'", William B. Scott, Aviation Week and Space Technology, Jun. 29, 1998, pp. 22–23.

"*Revised Technical And Operational Parameters For Typical IMT–2000 Terrestrial Systems Using High Altitude Platform Stations and CDMA Radio Transmission Technologies*", Radiocommunication Study Groups, Mar. 4, 1999Radiocommunication Study Groups, Mar. 4, 1999.

* cited by examiner

APPARATUS AND METHODS FOR CONTROLLING SHORT CODE TIMING OFFSETS IN A CDMA SYSTEM

TECHNICAL FIELD

The present invention relates generally to communication systems. More specifically, the present invention relates to code division multiple access (CDMA) communication systems that transmit pseudo noise (PN) codes from base stations to subscriber units over a pilot channel.

BACKGROUND OF THE INVENTION

Terrestrial communication systems have provided convenient wireless communications services for years. These services include, for example, cellular telephone services, paging, Internet access, and data transfer services, among others.

Code division multiple access (CDMA, e.g. IS-95) wireless communication systems have become particularly prevalent, because they have shown significant advantages over other radio spectrum utilization schemes, such as time division multiple access (TDMA) and frequency division multiple access (FDMA) systems. In particular, the increased efficiency of CDMA systems is due to improved coding and modulation density, interference rejection, multipath tolerance, and reuse of the same spectrum in every communication cell. The format of CDMA communication signals also makes it extremely difficult to intercept calls, thereby ensuring greater privacy for callers and providing greater immunity against fraud.

Figure 1:
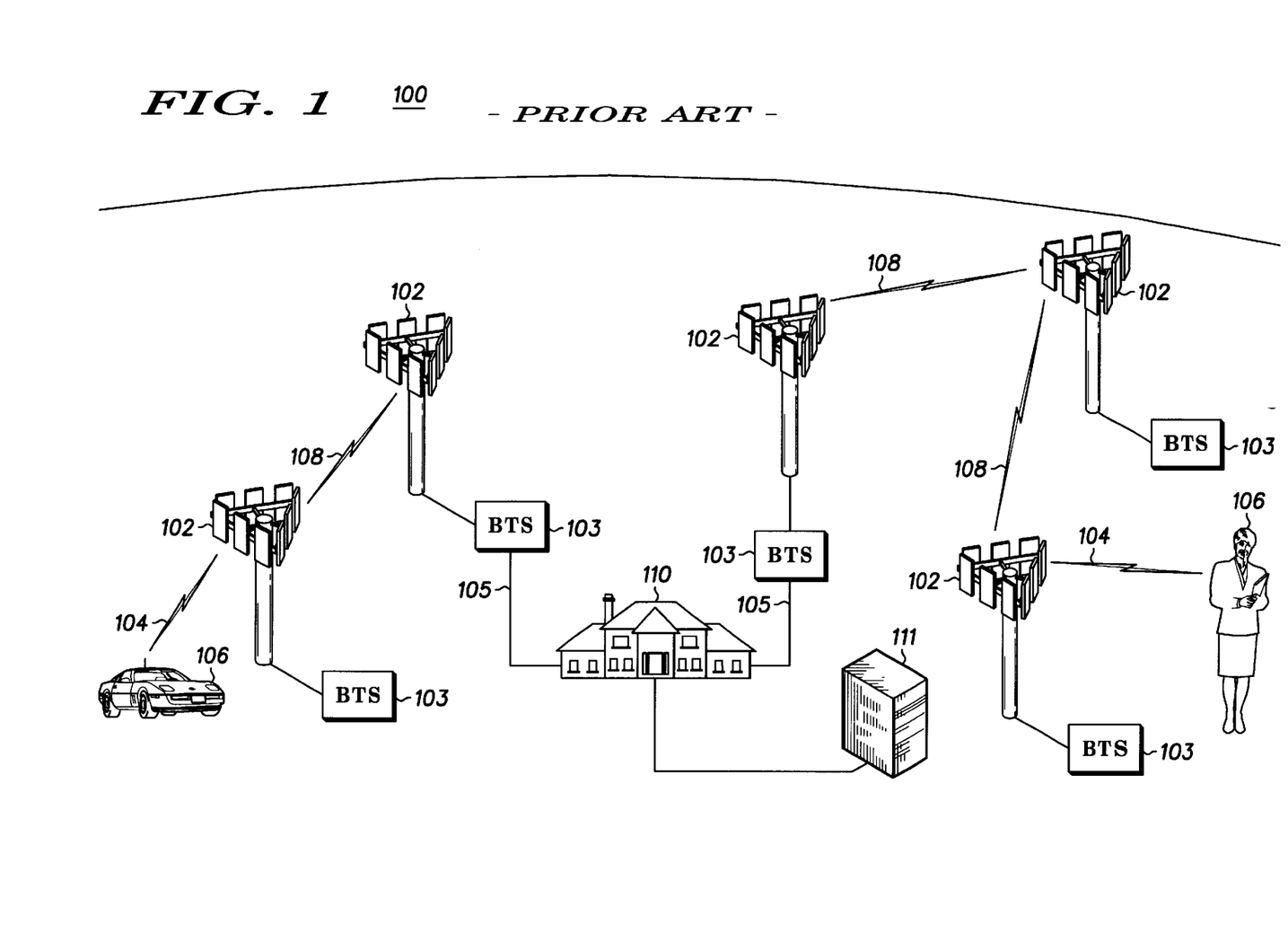
FIG. 1 illustrates a simplified block diagram of a terrestrial cellular communications network, in accordance with the prior art.

FIG. 1 illustrates a simplified block diagram of a terrestrial CDMA system 100, in accordance with the prior art. Network 100 includes one or more base station antennas 102 coupled to base transceiver stations (BTS) 103. Each BTS 103 communicates, via antennas 102 and subscriber links 104, with subscriber units carried by mobile users 106. Essentially, the BTS modulates and demodulates the information exchanged on the subscriber links 104, and it converts signals to and from the format used over the subscriber links.

BTS 103 also are coupled to a mobile switching office (MSO) 110. MSO 110 includes a switch that interfaces the cellular network and a public switched telephone network (PSTN, not shown). Thus, when network data originates from or is destined for a PSTN, this data is routed through MSO 110. The connection between a BTS 103 and MSO 110 can be a direct connection (e.g., using fiber optic or telephone (e.g., T1) links 105), or the connection 108 can be chained through other BTS 103, via links 108.

The network 100 also includes an operations and maintenance center (OMC) 111, which is manned by a human operator who evaluates status and control messages received from MSO 110, BTS 103, and/or other network elements or external sources. These messages could indicate, for example, that a piece of network equipment has failed, and/or how the various pieces of network equipment are performing. Based on the received messages, the OMC operator may initiate changes to the network, requesting that various network elements alter their operations.

In a CDMA system, data from multiple subscribers is spread across the same portion of the frequency spectrum. Each subscriber unit's baseband data signal is multiplied by a code sequence, called the "spreading code," which has a much higher rate than the data. Spreading the data in this manner results in a much wider transmission spectrum than the spectrum of the baseband data signal, hence the technique is called "spread spectrum."

A spreading code typically is a pseudo noise (PN) code that consists of a certain number of bits. Different length PN codes can be used for various purposes. One particular type of PN code is a "short code," which each BTS periodically modulates and transmits over the network's pilot channel. A pilot channel frame is as long as the short code, and evenly spaced offsets from the start of each pilot channel frame are identified as "offsets." Each BTS periodically starts transmitting the short code over the pilot channel at an offset that is different from the offsets at which other BTS start transmitting the short code. These different offsets are typically assigned by OMC 111 or MSO 110. During each frame of the continuous succession of pilot channel frames, all BTS should start transmitting the short code at their assigned offsets.

Figure 2:
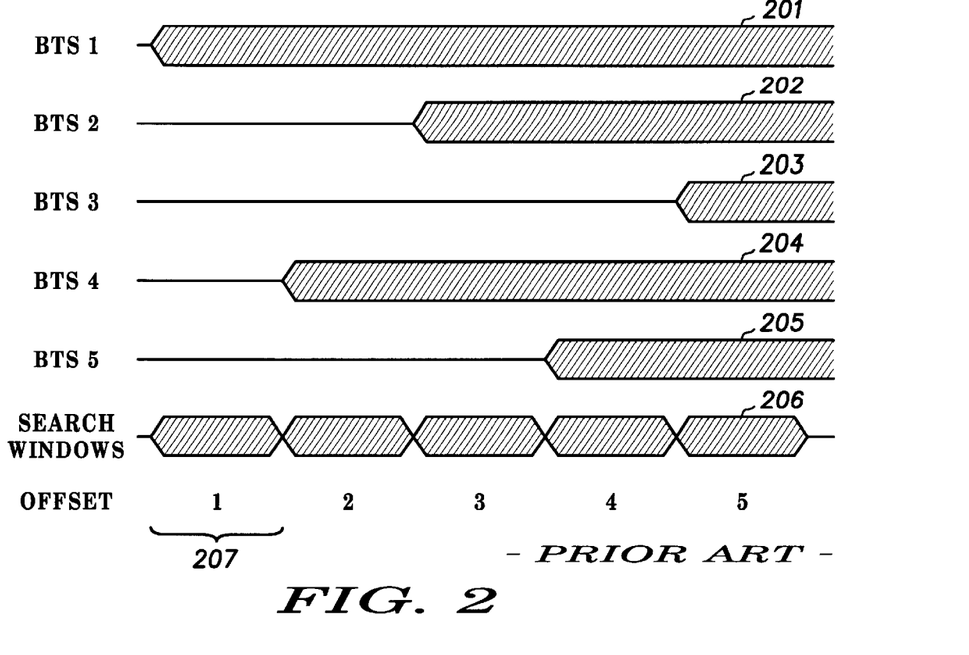
FIG. 2 illustrates a timing diagram showing multiple BTS's transmitting short codes at different offsets, in accordance with the prior art.

FIG. 2 illustrates a timing diagram showing multiple BTS beginning transmission of the short code at different offsets, in accordance with the prior art. In particular, timing diagrams 201–205 for short codes transmitted over the pilot channel for five BTS are shown. In addition, a timing diagram 206 is shown, which illustrates search windows 207, described below, within which a subscriber unit should search for the beginning of a particular BTS' short code. In the example shown in FIG. 2, BTS1 201 begins short code transmission at offset 1, BTS2 202 transmits at offset 3, BTS3 203 transmits at offset 5, BTS4 204 transmits at offset 2, and BTS5 205 transmits at offset 4.

Typically, many more offsets than are illustrated in FIG. 2 are available for the system's BTS to begin transmitting the short code. For example, the IS-95 protocol specifies that 512 offsets are available within a pilot channel frame, and each offset is separated from the previous offset by 64 chips. This means that the short code is 512×64 chips in length.

Figure 3:
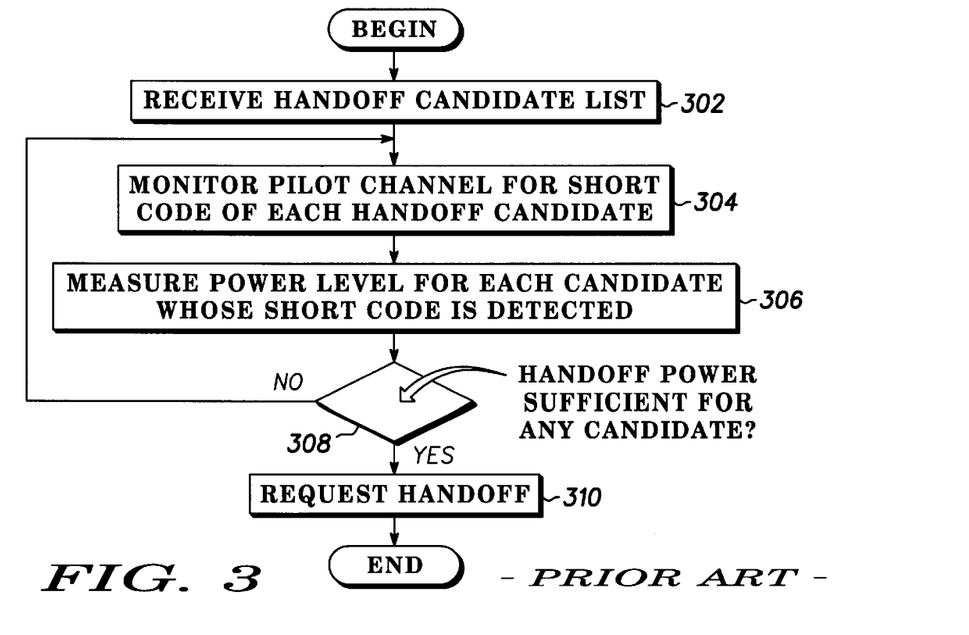
FIG. 3 illustrates a flowchart of a method for a subscriber unit to handoff from one BTS to another, in accordance with the prior art.

Subscriber units monitor the pilot channel and attempt to synchronize with candidate BTS to which the subscriber units can hand off. FIG. 3 illustrates a flowchart of a method for a subscriber unit to handoff from one BTS to another, in accordance with the prior art. The method begins, in block 302, when each subscriber unit that is communicating on the network receives, in a control channel from the BTS with which it is currently synchronized, a handoff candidate list that identifies various alternate BTS to which the subscriber unit, theoretically, could hand off. The handoff candidate list also identifies the offset at which each candidate BTS' short code is transmitted. Handoff candidate lists are transmitted periodically to the subscriber units, but FIG. 3 illustrates receipt of only a single handoff candidate list for ease of description.

In block 304, the subscriber unit monitors the pilot channel and attempts to synchronize with short codes transmitted by the candidate BTS's. The subscriber unit knows the short code, and attempts to correlate the known short code with the pilot channel signal within a time window, referred to as a "search window," that corresponds to the offset for each candidate BTS. Because the distance between the subscriber unit and each BTS imposes path delays on the signal, the search window has a width that accounts for path delays resulting from a range of possible distances between the candidate BTS's and the subscriber unit. This range typically is known for a terrestrial network, and thus the search window can be fixed by the system. Generally, the search window is selected to be at least as narrow as the offset length, so that a maximum number of offsets can be allocated to BTS's, and so that the subscriber unit is able to search for a particular short code quickly.

For each handoff candidate for which the subscriber unit finds a high degree of correlation between the known short code and the received signal, the subscriber unit measures the power of the signal, in block 306. The subscriber unit determines, in block 308, whether the power is sufficiently greater than the power of the signal transmitted by the current BTS. If not, the procedure iterates as shown. If so, then the subscriber unit requests to be handed off to the candidate BTS, in block 310, and the method ends. After handoff, since the subscriber unit is synchronized to the new BTS, the subscriber unit can despread data received from the new BTS using another known PN code.

In order for a system to provide a maximum number of offsets (and, thus, candidate BTS's), the search window must be at least as narrow as the offset length. A system that incorporates this limitation makes it impossible for a subscriber unit to synchronize with a BTS that is farther than a certain distance from the subscriber unit. This is because a short code transmitted by a BTS that is too far away will not reach the subscriber unit within the time spanned by the search window. Therefore, even if a particular BTS has the capacity to provide service to a subscriber unit, it cannot do so if it is too far from the subscriber unit.

One solution is to widen the search window for each candidate BTS. An unfortunate result of this solution, however, is that fewer offsets would be available to assign if the search window width exceeds the pilot channel offset width. In such a case, less than the maximum number of candidate BTS's would be available. In addition, the subscriber unit would take longer to search for each short code.

What are needed are methods and apparatus that enable a maximum number of BTS candidates to be potentially available for a subscriber unit to hand off to. In addition, what are needed are methods and apparatus that enable a subscriber unit to synchronize to a BTS short code even if that BTS is farther from the subscriber unit than the predefined search window otherwise permits.

DETAILED DESCRIPTION

The methods and apparatus of the present invention are implemented in a cellular communications network that integrates airborne transceivers with current terrestrial cellular networks. This integration of airborne transceivers and terrestrial cellular networks is referred to herein as an "airborne cellular network" or "airborne network." These terms are not meant to imply that all cells of the network are provided by airborne transceivers, although that could be the case, in one embodiment.

Each airborne transceiver is part of a payload carried by an aircraft, and the transceiver provides communication links between cellular subscriber units and one or more BTS's. In this airborne network, each aircraft strives to maintain a relatively stable flight pattern, typically over a fixed geographic area. Cells or antenna beams projected toward the earth by the airborne transceiver provide communications coverage within that area.

In one embodiment, the airborne network is incorporated into a conventional, terrestrial cellular network without substantially modifying the network's infrastructure (i.e., BTS's, MSOs, and cellular communications equipment). Essentially, the airborne transceiver is used as a repeater that is interjected between the cellular equipment and one or more BTS's.

One distinction between a conventional terrestrial network and the airborne network of the present invention is the impact that the path length between the BTS and subscriber unit has on the timing of the pilot channel's short codes. The path between the BTS and a subscriber unit includes a path between the BTS and the aircraft, and a path between the aircraft and the subscriber unit. This path generally will be substantially longer than a path between a BTS and subscriber unit in a terrestrial network. Thus, the path delay for signals transmitted between the BTS and subscriber unit is much longer in the airborne network. This means that a short code transmitted at a particular offset may not be seen by the subscriber unit within the search window for that offset. In other words, the subscriber unit may think a particular short code will begin around an offset of 10, but the short code may not arrive until around offset 13, due to the airborne system's longer path delay.

As will be described in more detail below, the method and apparatus of the present invention solves the path delay problem by having the BTS transmit the short code at an offset that is different from the offset that is reported to the subscriber unit. Thus, for example, a BTS would transmit the short code at offset 10, but the subscriber unit would be informed to search for the short code around an offset of 14.

The difference between the transmit offset and the reported offset compensates for the longer path delay inherent in the airborne network. Different transmit offsets also could be used when major deviations in the aircraft's flight pattern occur, for example, due to weather conditions or air traffic control instructions, which cause a substantial change in the path length characteristics.

Another distinction between a conventional terrestrial network and an airborne network of the present invention is that, unlike the terrestrial network, the communication cells provided by the aircraft payload may not be fixed with respect to the surface of the earth. As will be described below, each aircraft provides multiple communication cells to subscriber units on the ground, and each cell can support multiple channels. As the aircraft moves along its flight pattern, the cells sweep across the surface of the earth, making handoffs between cells necessary in order to maintain a cellular call. Handoffs can also be made as subscriber units move into or out of cells provided by terrestrial base stations.

In addition, the aircraft movement along its flight pattern causes the path lengths for various communication channels to lengthen or shorten. In one embodiment, the present invention compensates for the corresponding increases or decreases in the path delay by the BTS imposing a variable delay, in real time, to the short code before modulating and transmitting it to the subscriber unit.

Figure 4:
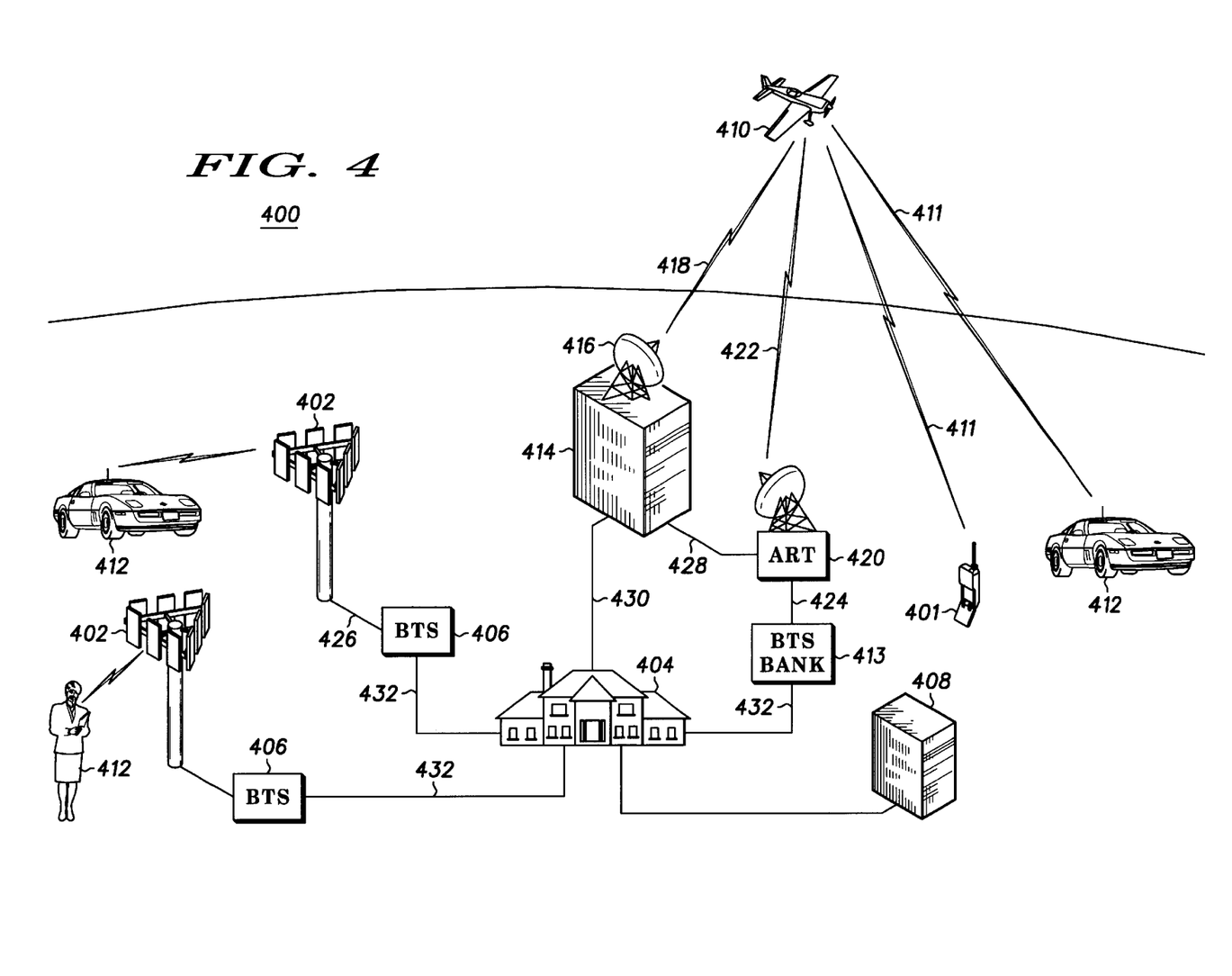
FIG. 4 illustrates a simplified block diagram of an airborne cellular communications network, in accordance with one embodiment of the present invention.

FIG. 4 illustrates a simplified block diagram of an airborne cellular communications network 400, in accordance with one embodiment of the present invention. Network 400 includes the elements of a conventional terrestrial network, including base station antennas 402, MSO 404, BTS's 406, and OMC 408. In addition, network 400 includes multiple cellular subscriber units 401, which may be fixed or may be carried by mobile users 412.

Network 400 also includes one or more aircraft 410, one or more BTS banks 413, one or more aircraft radio terminals (ART) 420, and an aero control center 414. As used herein, the term "control center," by itself, means either the aero control center 414, the OMC 408, or both.

As used herein, a "cellular subscriber unit" means mobile or fixed communication equipment that sends and/or receives information over a wireless link to and/or from a transceiver, receiver, and/or transmitter of network 400. The transceiver, receiver, and/or transmitter could be associated with a base station antenna 402 or with aircraft 410. A cellular subscriber unit can be, for example, a cellular telephone, pager, radio, computer terminal or any other electronic device or network that sends and/or receives data over a wireless link.

Aircraft 410 could be, for example, an airplane, helicopter, balloon, dirigible or any piloted or unmanned, fixed wing, rotor wing or lighter-than-air vehicle that is capable of carrying a payload. In one embodiment, the aircraft is an airplane, whose pilot is responsible for flying the airplane (e.g., operating the manual controls and the autopilot system) and verbally communicating with air traffic control (ATC) and an aircraft operations center (AOC) (not shown).

The aircraft also includes an aircraft flight management system (AFMS) (not shown), in one embodiment. The AFMS includes an autopilot system, GPS equipment, avionics equipment, data collection equipment, and control equipment. Among other things, the AFMS is responsible for maintaining the correct flight pattern and profile via the autopilot system. The aircraft flight pattern is an instantaneous description of the aircraft's current or future position (i.e., latitude, longitude and/or altitude) and heading, and/or a description of a path along which the aircraft should fly. In various embodiments, one or multiple aircraft can be tasked with servicing a particular area. As used herein, the term "aircraft" includes the aircraft itself, the AFMS, and the aircraft payload.

Each aircraft 410 carries a payload, which acts as a transceiver or repeater between the network's ART 420 (and, thus BTS bank 413) and multiple cellular subscriber units 401. The aircraft payload includes antennas, radio frequency (RF) amplifiers, RF converters, and possibly analog-to-digital (A/D) and digital-to-analog (D/A) converters. The payload's antennas could be phased array antennas, reflectors, horns, patch antennas or some other type of antenna, in various embodiments. The payload also includes computing equipment that functions to control the payload antennas, converters, and other equipment.

As described previously, the payload functions as a transceiver or repeater, communicating data between cellular subscriber units 401 and ART 420, which are each coupled to a bank 413 of one or more BTS's. In one embodiment, the payload communicates in one frequency range to ART 420 and in another frequency range to cellular subscriber units 401. The aircraft payload receives RF signals from ART 420 over ART link 422, downconverts those signals to appropriate cellular frequencies, and provides the cellular signals to the cellular subscriber units associated with users 412, via subscriber link 411. On the reverse path, the payload receives RF signals from the cellular subscriber units 401, upconverts the signals to the frequency range used on the ART link 422, and transmits the upconverted signals to ART 420. In one embodiment, RF signals are exchanged with ART 420 at frequencies within the C-band (e.g., 3–8 GHz), and they are exchanged with cellular subscriber units within a frequency range of about 800–1800 MHz. In other embodiments, signals could be exchanged with ART 420 or cellular subscriber units at frequencies within other ranges, depending, among other things, on the type of communications protocol used.

In one embodiment, network 400 also includes an aero control center 414, which communicates with aircraft 410 via antenna 416 and aircraft telemetry and control link 418. Aero control center 414 is a distributed or centralized computing apparatus, which includes an aircraft operations controller (AOC) (not shown) and subsystem status and control equipment (SS&C) (not shown). The AOC and the SS&C basically function to receive information regarding aircraft flight parameters and weather information, derive control messages from the parameters and weather information, and send the control messages to devices within the airborne or terrestrial segments of network 400. In addition, in various embodiments, a pilot can communicate verbally with the AOC or can enter changes into the aircraft's autopilot system, where those changes are thereafter transmitted to the AOC.

The aircraft payload collects, from the AFMS, information relevant to the aircraft's flight parameters, and periodically transmits that information to the aero control center 414 over RF link 418, in one embodiment. This flight parameter information could be an entire or partial description of the aircraft flight pattern, position, attitude or flight characteristics, describing the current or desired future state of the aircraft. The aircraft position includes the aircraft's altitude, latitude, longitude, and/or other information (e.g., distance or direction from a landmark). In addition to collecting and transmitting flight parameter information to control center 414, the aircraft payload also provides communication channels to multiple cellular subscriber units 401 with users 412 over RF links 411.

To communicate with ART 420 and MSO 404, aero control center 414 exchanges messages over ART control link 428 and MSO control link 430, respectively. In one embodiment, links 428 and 430 are hardwired links (e.g., coaxial or fiber optic cable), although either or both links 428 and 430 could be wireless links in other embodiments.

Although aero control center 414 is shown as being located in a single facility in FIG. 4, various portions of control center 414 could be located in separate facilities. For example, in various embodiments, portions or all of the control center functionality could be located in MSO 404, OMC 408, ART 420, BTS 406, aircraft 410 or other facilities (not shown).

As mentioned previously, network 400 includes one or more MSO's 404. MSO 404 functions as a mobile switching center (MSC) and as a base station controller (BSC), in one embodiment. In the capacity of MSC, MSO 404 interfaces network 400 with a PSTN (not shown) and/or other network (s). In the capacity of BSC, MSO 404 controls all or some of the network's base station antennas 402, BTS 406, BTS bank 413, and ART 420. In some cases, MSO 404 receives information that MSO 404 uses to change the offsets at which the BTS 406, 413 transmits its short code over the pilot channel. In one embodiment, the information originates from the OMC 408. In other embodiments, the information could originate from the aero control center 414 or from other network elements.

MSO 404 communicates with BTS 406 and BTS bank 413 over links 432. In one embodiment, links 432 are hardwired links (e.g., coaxial or fiber optic cable), although they could be wireless links in other embodiments.

Network 400 also includes OMC 408, which is co-located with MSO 404, in one embodiment. In alternate embodiments, OMC 408 is housed in a separate facility from MSO 404 or distributed across multiple facilities.

OMC 408 is manned by a human operator who evaluates status and control messages received from MSO 404, aircraft 410, BTS 406, BTS bank 413, ART 420, and/or other network elements or external sources. These messages could indicate, for example, that a piece of network equipment has failed, and/or how the various pieces of network equipment are performing.

OMC 408 receives various telemetry, status, and control information, and determines what changes should be made to the network. In one embodiment, OMC 413 can communicate directly or indirectly with MSO 404, BTS 406, BTS bank 413 (a plurality of BTS's), ART 420, base station antennas 402 or aircraft 410 to cause one or more of those network elements to alter their operations based on the received telemetry, status, and control messages. In various embodiments, other network elements, such as the aero control center 414 or some other automated or human entity, also or alternatively could make network changes.

In one embodiment, the OMC 408 calculates the offset at which each BTS should transmit its short code over the pilot channel (referred to herein as the "transmit offset"), and also the offsets that the subscriber units should use to determine when to look for each BTS short code (referred to herein as the "reported offset"). OMC 408 then sends one or more control messages derived from the offsets to the MSO 404, BTS 406, and/or BTS bank 413. These control messages enable the BTS's to determine when to transmit their short codes, or in the case of MSO 404, the messages enable MSO 404 to control operations of the BTS's.

The control messages may include the offsets themselves or may include instructions or other information derived from the offsets. For example, the control messages may include the transmit offset and the reported offset, or the control messages may include one of those offsets and a delta that indicates the difference between the two. Alternatively, the messages may include the transmit offsets or a delta, and a handoff candidate list that includes the reported offsets.

In one embodiment, in order to affect the operations of one or more BTS's 406, 413, OMC 408 sends control messages to MSO 404. MSO 404 in turn uses information within the control messages to control operations of one or more of the BTS's 406, 413. In some cases, MSO 404 sends the control message directly to BTS's 406, 413. In other cases, MSO 404 may evaluate the control message, and derive a modified control message to send to BTS's 406, 413.

When BTS's 406, 413 receive the original or modified control message from MSO 404, BTS's 406, 413 use the offset information within the message to control when it transmits its short code over the pilot channel. BTS's 406, 413 may receive the control message over a wired link or over a wireless link via base station antenna 402. In other embodiments, BTS's 406, 413 may receive a control message from OMC 408 via aircraft 410 and ART 420.

Figure 5:
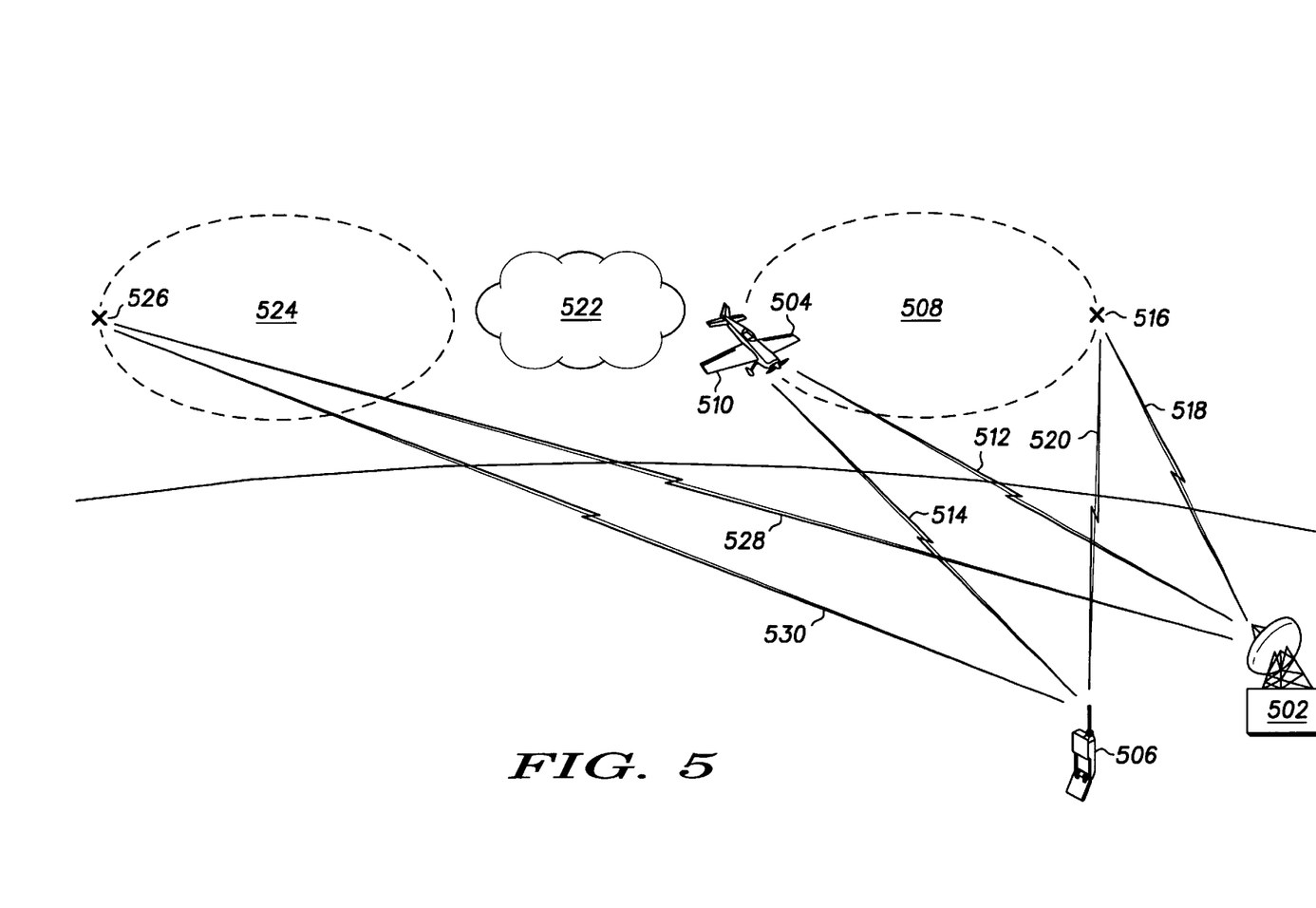
FIG. 5 illustrates various examples of communication paths between a BTS, an aircraft, and a subscriber unit, in accordance with one embodiment of the present invention.

FIG. 5 illustrates various examples of communication paths between a BTS bank 502, an aircraft 504, and a subscriber unit 506, in accordance with one embodiment of the present invention. As described previously, aircraft 504 follows a flight pattern 508 over a particular geographic area. While following this flight pattern, aircraft 504 acts as a transceiver, relaying signals between BTS bank 502 and one or more subscriber units 506.

When in a first position 510 along its flight pattern 508, the path length of the communication path between BTS 502 and subscriber unit 506 is approximately the sum of the length of the link 512 between the BTS 502 and the aircraft 504, and the length of the link 514 between the aircraft 504 and the subscriber unit 506. Similarly, when the aircraft reaches a second position 516 along its flight pattern 508, the path length approximately equals the sum of the lengths of links 518 and 520.

A message (e.g., a short code) transmitted over the communication path would experience a path delay that is proportional to the entire path length. The longer the path length, the longer the path delay. Accordingly, a message transmitted over path 512, 514 would experience a longer path delay than a message transmitted over path 518, 520.

Because aircraft 510 typically would fly at a relatively high altitude and provide coverage over a large area, the path lengths between the BTS 502 and subscriber unit 506 would be substantially longer than the path lengths experienced in prior art, terrestrial systems. Thus, a short code transmitted by BTS 502 in accordance with prior art methods may not reach the subscriber unit 506 within the search window associated with the predetermined offset for that BTS 502. In addition, the variations in path lengths that occur due to the aircraft following its flight pattern 508 may cause the transmitted short code offset, and the search window necessary to detect the short code, to vary over the flight pattern.

In accordance with one embodiment of the present invention, these problems are solved by applying one or both of the following techniques: 1) transmitting the short code at a different offset (i.e., the transmit offset) than the subscriber unit searches (i.e., the reported offset); and 2) imposing a variable delay on the short code before it is modulated and transmitted by the BTS. Using the first technique, the transmit offset and the reported offset are determined by a control center based on the predicted aircraft flight pattern. These offsets are different from one another by a value of delta, which compensates for the predicted path delay. The control center sends the BTS the transmit and reported offsets. The BTS 502 starts transmitting the short code at the transmit offset, but informs the subscriber unit 506 to search for the short code during the later, reported offset.

Using the second technique, the path length variations that occur while the aircraft follows its flight pattern 508 are compensated for by imposing a variable delay to the short code before the BTS 502 modulates and transmits it. The processes of using different transmit and reported offsets and applying a variable delay are described in more detail below.

In one embodiment, each aircraft 510 sends information to the control center indicating the aircraft location. Using the aircraft location, the control center can communicate with the BTS 502 to alter short code transmit offsets in order to achieve optimal network performance.

Occasionally, aircraft 510 may be required to deviate substantially from its normal flight pattern 508. This may be due to weather events, such as a thunderstorm 522, or from other events, such as instructions from an air traffic controller (ATC). In such cases, aircraft 510 may follow a different flight pattern 524. This may result in even greater path delays than would be encountered when the aircraft was following its normal pattern. For example, if aircraft 510 were at position 526 along the different flight pattern 524, the path length would be approximately the sum of links 528 and 530. This path length is substantially longer than the normally encountered path lengths.

In one embodiment, large deviations in path lengths are compensated for in real time by altering the reported and/or transmit offsets, as necessary, at the time that the deviations occur. The control center receives telemetry indicating the change in aircraft position, recalculates the transmit and/or reported offsets, and sends information describing the new offsets to the relevant BTS. In another embodiment, the large deviations in path lengths could be handled by changing the variable delay applied to the BTS' short code.

Figure 6:
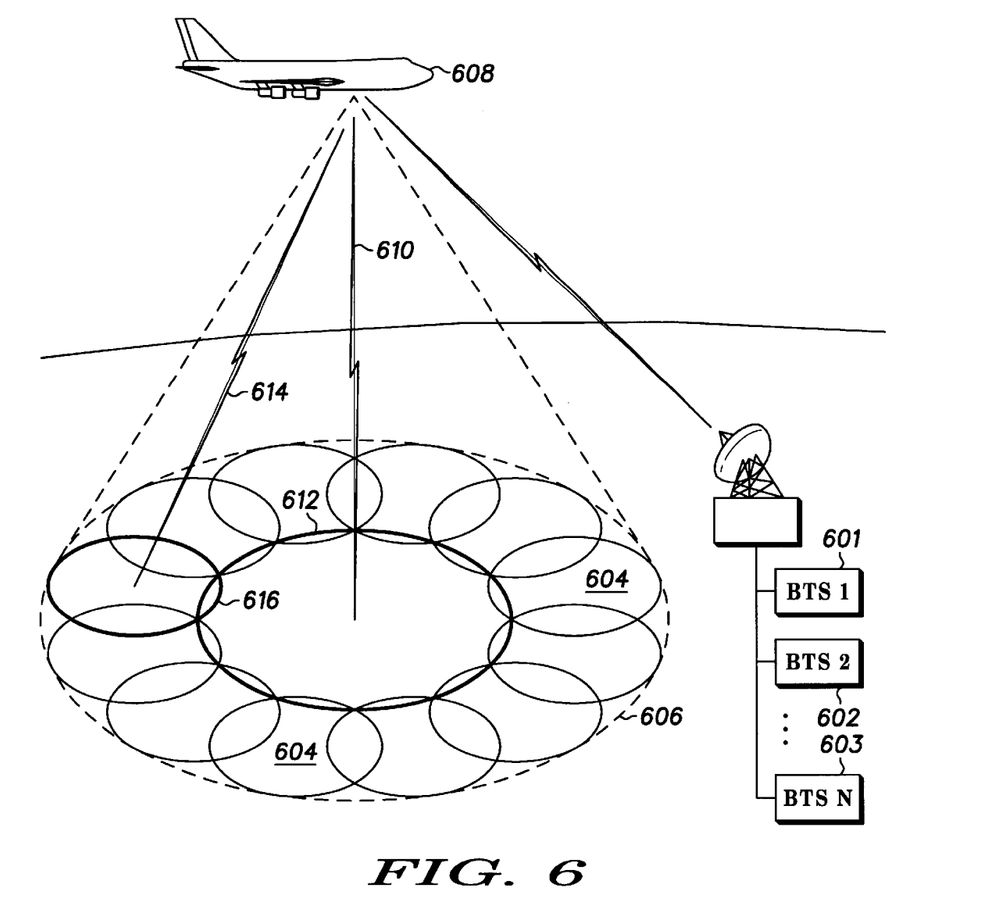
FIG. 6 illustrates communication paths between a BTS bank and various cells within a coverage footprint projected by an aircraft, in accordance with one embodiment of the present invention.

Besides path length deviations that occur due to the position of the aircraft, communication paths within each cell of the aircraft cell footprint could have a path length that is different enough from other cells to warrant application of either or both of the above techniques. FIG. 6 illustrates communication paths between BTS's 601–603 and various cells 604 within a coverage footprint 606 projected by an aircraft 608, in accordance with one embodiment of the present invention.

Within coverage footprint 606, multiple communication channels are provided within each of multiple cells 604 projected within footprint 606. In one embodiment, a BTS's 601–603 is associated with each cell 604. Accordingly, if N cells are present in the footprint 606, N BTS's 601–603 would be included in the BTS bank associated with that footprint.

In one embodiment, footprint 606 has a radius in a range of about 50–200 kilometers, although footprints having larger or smaller radius could be employed in other embodiments. Additionally, in one embodiment, the cell radius is in a range of about 5–25 kilometers, although larger or smaller cell radius could be employed in other embodiments. In the embodiment shown, footprint 606 includes thirteen cells 604, providing anywhere from 1–300 channels per cell. In alternate embodiments, more or fewer cells 604 could be included within footprint 606, and each cell could provide a number of channels in a different range.

The length of the links between the aircraft 608 and the ground can be different for various cells. For example, the path length 610 for a center cell 612 would be shorter than the path length 614 for a cell 616 at the perimeter of footprint 606. Depending on the cell configuration within footprint 606, the difference in path lengths could be significant enough to warrant different deltas between the transmit and reported offsets associated with the BTS for each cell.

In accordance with various embodiments of the present invention, these disparities in path length between the aircraft's cells are compensated for using different delta values for some of the BTS's and/or by imposing different variable delays before modulating and transmitting the short codes over the pilot channel.

Figure 7:
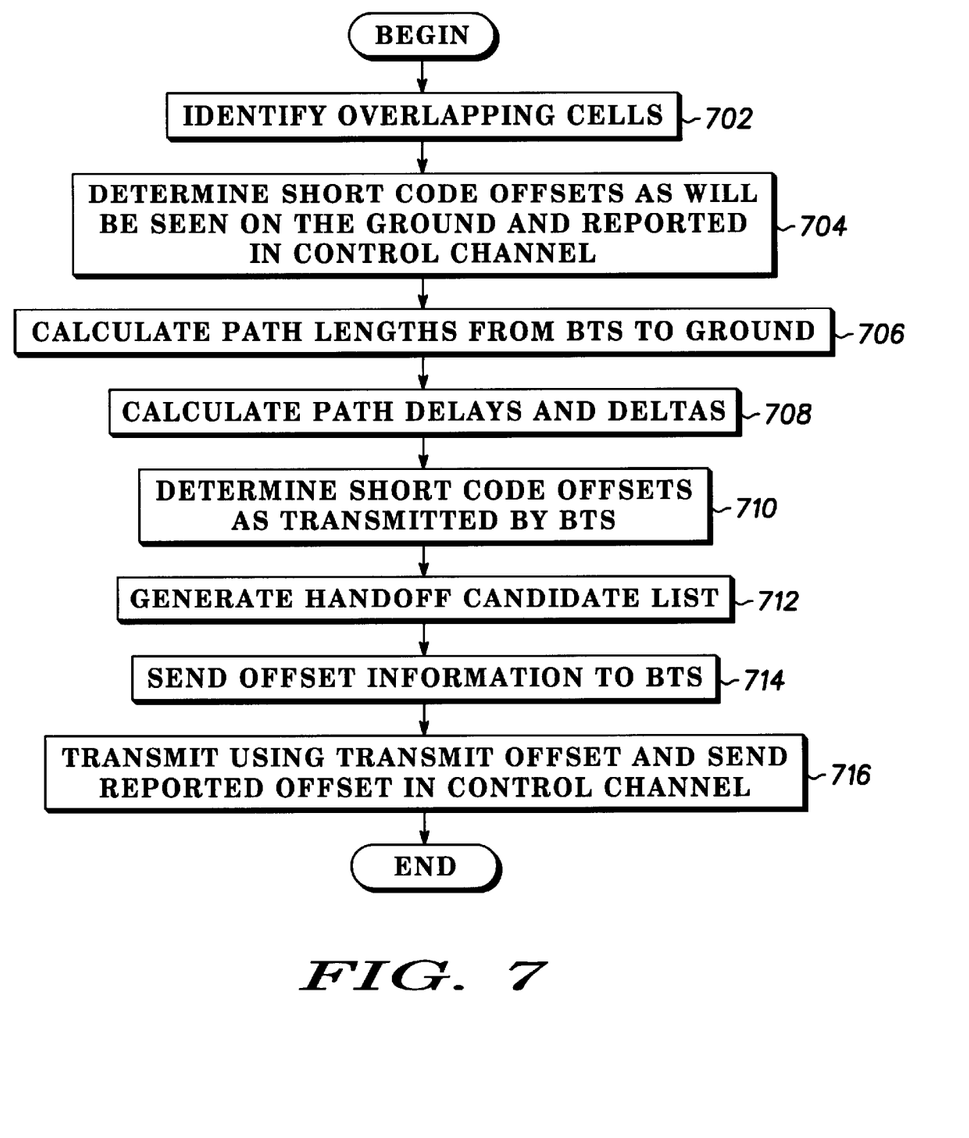
FIG. 7 illustrates a flowchart of a method for a control center to determine reported and transmit offsets, in accordance with one embodiment of the present invention.

FIG. 7 illustrates a flowchart of a method for a control center to determine reported and transmit offsets, in accordance with one embodiment of the present invention. In determining offsets for the various network BTS's, it is important for the control center to ensure that a short code transmitted at an offset allocated to one BTS' cell does not interfere with a short code transmitted at an offset allocated to another BTS' cell. Interference could occur, for example, if BTS's associated with overlapping cells transmitted their short codes at roughly the same offset (e.g., within the search window for an offset). In such a case, it would be impossible for a subscriber unit to identify which BTS's transmitted which short code.

Accordingly, the method begins, in block 702, by identifying overlapping cells provided by the aircraft and/or terrestrial base stations. Generally, adjacent aircraft-provided cells overlap each other to some degree. Therefore, the control center would identify any adjacent cells as overlapping cells, in one embodiment. In addition, cells provided by an aircraft may overlap cells provided by terrestrial base stations. Based on the aircraft's predicted flight pattern, and knowledge of the locations of terrestrial cells, the control center can determine which aircraft cells will overlap which terrestrial cells.

In the airborne system of the present invention, in one embodiment, the offset allocations take into account the fact that the aircraft-provided cells are moving across the surface of the earth. The aircraft cells preferably have offsets that will not cause interference with short codes transmitted by terrestrial BTS's over which the aircraft cells pass while the aircraft travels along its flight pattern. In one embodiment, therefore, overlapping cells are identified during an entire revolution of the aircraft around its flight pattern. In this manner, it is possible to determine offsets so that the transmitted short codes will not interfere with other transmitted short codes for an entire aircraft revolution around its flight pattern. In an alternate embodiment, the offsets could change as the aircraft moves to different positions along its flight pattern.

Once overlapping cells have been determined, the control center determines, in block 704, short code offsets as they will be seen on the ground and reported in the control channels to subscriber units. This determination results in an offset "plan," which maps offsets to aircraft-provided and terrestrial cells.

Figure 8:
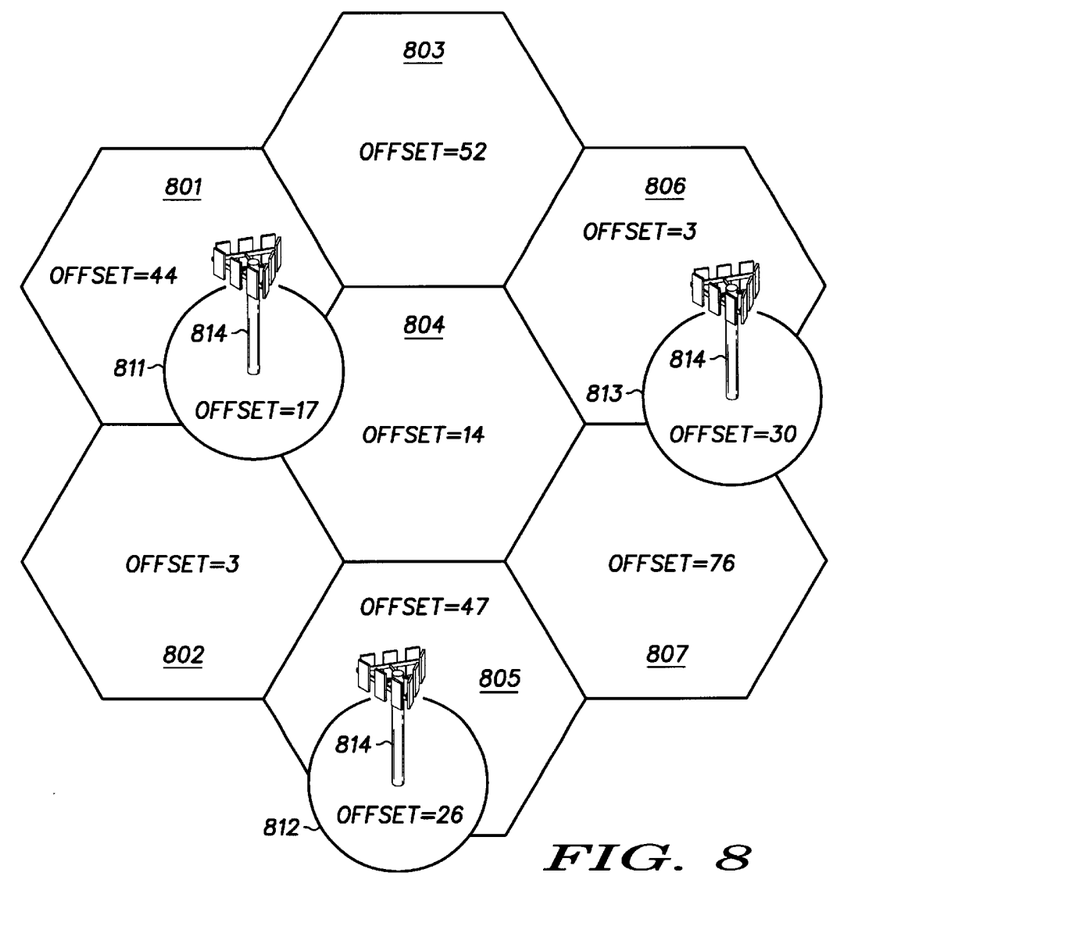
FIG. 8 illustrates an example of an offset plan for multiple overlapping cells, in accordance with one embodiment of the present invention.

FIG. 8 illustrates an example of an offset plan, as seen on the ground, for multiple overlapping cells, in accordance with one embodiment of the present invention. Hexagonal cells 801, 802, 803, 804, 805, 806, and 807 represent cells provided by an aircraft at one point during its flight pattern, in accordance with one embodiment. Circular cells 811, 812, and 813 represent cells provided by terrestrial base stations via base station antennas 814.

An example offset is associated with each cell 801–807, 811–813. These offsets were allocated by the control center, in one embodiment. Using cell 804 as a starting point, the control center would have identified cells 801, 802, 803, 805, 806, 807, and 811 as overlapping cells. Accordingly, the control center would allocate offsets to each overlapping cell that would not cause interference with a short code transmitted at the offset for cell 804. Cell 804 is shown to have an offset of 14, and each of the overlapping cells are shown to have different offsets. Therefore, the planned offsets should not cause interference, at this point in the flight pattern, between cell 804 and any overlapping cells.

Offsets can be reused, in some cases. In particular, offsets can be reused for non-overlapping cells. Because cells 802 and 806 are not adjacent and non-overlapping, the control center could allocate the same offset to both of these cells. In the example shown, both cells have an offset of 3. The control center also could give a cell provided by a terrestrial base station and a cell provided by the aircraft the same offset. However, the control center would make certain, before any such reuse was implemented, that the aircraft-provided cell would not pass over the terrestrial cell, in one embodiment.

The offsets determined in block 704 correspond to the offsets that are reported to the subscriber units. In other words, these reported offsets indicate times when the subscriber units should search for short codes in signals transmitted by various BTS's. In one embodiment, the reported offsets are sent to the subscriber units in the form of a handoff candidate list. As will be described in more detail below, the handoff candidate list is periodically transmitted to each subscriber unit by a BTS with which the subscriber unit is synchronized. In other embodiments, the offsets could be sent to the subscriber units using some other message format.

After the reported offsets are determined, then the control center determines, in blocks 706–710, transmit offsets that indicate times at which the various BTS's should begin transmitting their short codes. For the aircraft-provided cells, the transmit offsets take into account the path delay associated with the long paths between the BTS's and subscriber units via the aircraft.

In block 706, for each aircraft-provided cell, the control center calculates a path length from a BTS, through the aircraft, and to the area on the ground corresponding to that BTS' cell, in one embodiment. This calculation involves determining a length of a link between the BTS and the aircraft, and determining a length of a link between the aircraft and the ground within each cell. The control center then calculates a sum of the lengths of the first and second links, which equals the path length. In an alternate embodiment, the control center could calculate an average path length for all cells provided by the aircraft. This average path length would be the sum of the length of the link between the BTS and the aircraft, and the average length of the links between the aircraft and the ground within each of the aircraft-provided cells. Other calculations that approximate the entire path length also could be used, in various embodiments. Therefore, the path length is only approximately the sum of the lengths of the first and second links.

After the path length (or lengths) is determined, the control center calculates, in block 708, the path delay that would be experienced by signals transmitted between the BTS and subscriber units on the ground. For each aircraft-provided cell, the path delay approximately equals the path length divided by the propagation speed of the RF signals through the air.

In one embodiment, this path delay is represented in fractions of seconds. Because offsets are quantified in terms of chips, the path delay is converted to chips, in one embodiment. The number of chips corresponding to the path delay is then converted into a "delta" value. The delta value represents a number of offsets, and is calculated by dividing the number of chips corresponding to the path delay by the number of chips per offset. For example, the control center could determine that the path delay corresponds to 215 chips. In IS-95, because each offset is allocated 64 chips, this corresponds to approximately 3.4 offsets. In one embodiment, the delta value is rounded up or down to the closest integer. Thus, the delta value for the present example would be 3 offsets.

Figure 9:
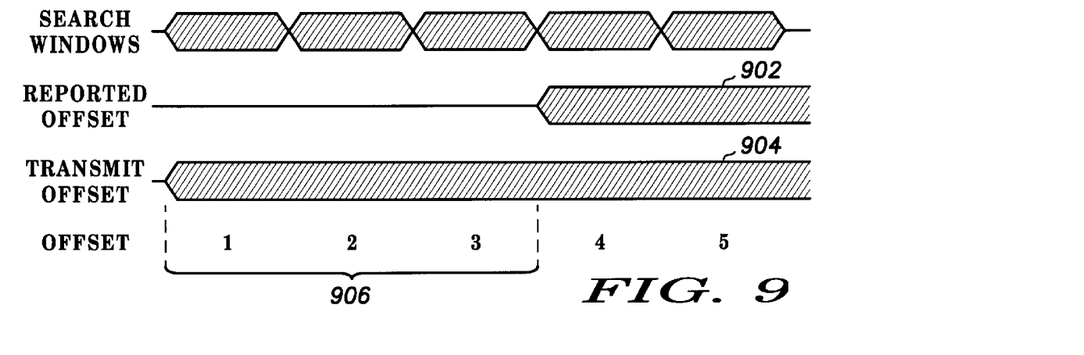
FIG. 9 illustrates a timing diagram showing an example delta between a reported offset and a transmit offset, in accordance with one embodiment of the present invention.

Using the delta value, the control center then determines, in block 710, the short code offsets as should be transmitted by the various BTS's. The transmit short code offset for a particular BTS equals the BTS' reported offset minus the delta. FIG. 9 illustrates a timing diagram showing an example delta between a reported offset and a transmitted offset, in accordance with one embodiment of the present invention. The reported offset 902 corresponds to offset number 4, and the transmit offset corresponds to offset number 1. The delta 906, therefore, equals 3 offsets. In one embodiment, the transmit offset is always earlier than or equal to the reported offset. In some cases, however, when the delta moves the transmit offset into a previous pilot channel frame, it may appear that the transmit offset is later than the reported offset due to the periodic nature of the short code transmissions.

Figure 10:
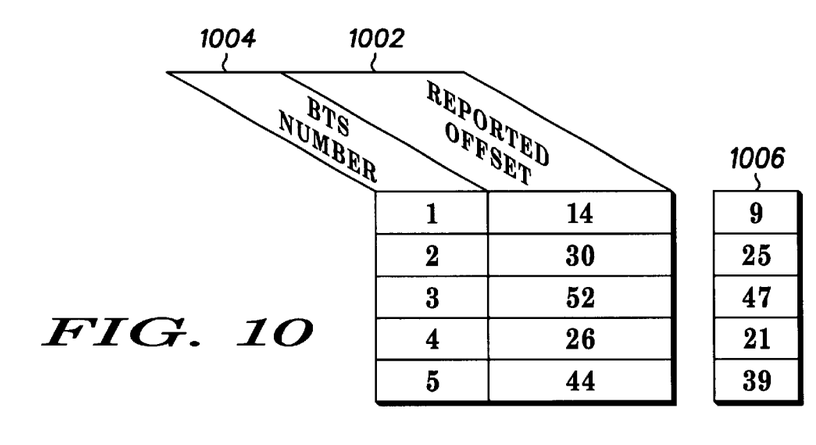
FIG. 10 illustrates an example of a handoff candidate list, in accordance with one embodiment of the present invention.

A handoff candidate list that includes the reported offsets is generated, in block 712, by the control center. FIG. 10 illustrates an example of a handoff candidate list, in accordance with one embodiment of the present invention. The handoff candidate list indicates the reported offset 1002 that corresponds to each BTS 1004 that a subscriber unit, theoretically, could hand off to. Basically, the handoff candidate list includes the reported offsets determined previously in block 704.

A subscriber unit receives the handoff candidate list from a BTS with which it is synchronized over a control channel, in one embodiment. For each BTS listed in the handoff candidate list, the subscriber unit searches for a short code on the pilot channel around the offset corresponding to that BTS. For example, the subscriber unit would search across a search window for the short code corresponding to BTS1 at around offset number 14.

FIG. 10 also shows example transmit offsets 1006 for the various BTS's, although these are not included in the handoff candidate list, in one embodiment. Using the prior example, BTS1 would transmit its short code during offset number 9 and the reported offset is 14. The delta between the reported and transmit offsets, thus, has a value of 5 offsets. Thus, BTS1 would transmit the short code 5 offsets before the subscriber unit would search for the short code for BTS1.

In other embodiments, the handoff candidate list could be generated earlier in the process. For explanatory purposes, in order to compare the list's reported offsets with example transmit offsets, however, the list generation block is shown after determining the transmit offsets.

Referring back to FIG. 7, offset information is sent to the various BTS's, in block 714. The offset information can be sent directly from the control center, in one embodiment, or can be sent to the BTS's via an MSO.

The offset information includes the handoff candidate list and information that identifies the transmit offset for each BTS. In one embodiment, the information identifying the transmit offset is the transmit offset itself. In another embodiment, rather than sending the transmit offset, the delta is sent instead, and the BTS's would calculate the transmit offset by subtracting the delta from the reported offset in the handoff candidate list.

In block 716, the BTS begins transmitting its short code using the appropriate transmit offset, and sending the reported offset to the subscriber units in its control channel. In one embodiment, the BTS sends the reported offset in the form of the handoff candidate list. In some cases, the BTS may be informed to wait until a certain time to implement the new transmit offset and to send the new reported offsets to the subscriber units. The method then ends.

As described previously, as an aircraft travels along its flight pattern, the variations in path length could cause a BTS' transmitted short code to be received, on the ground, at a different offset from the reported offset. In one embodiment, this could be compensated for by periodically changing the transmit offsets at certain points along the flight pattern. This process may result in a glitch, however, in the subscriber unit's ability to synchronize with a BTS' short code.

In another embodiment, rather than periodically changing the transmit offset, transmission of a BTS' short code is delayed, in real time, to accommodate for variations in the path length as the aircraft flies along its flight pattern. This is accomplished by adding a delay element to the BTS, so that a variable delay can be imposed on the short code before it is modulated and transmitted to the subscriber unit over the pilot channel.

In one embodiment, the system calculates the variable delay so that: path delay+variable delay=pre-defined constant. The pre-defined constant is selected so that, during normal operations, the variable delay will always be greater than or equal to zero. Accordingly, no matter where the aircraft is along its flight pattern, the overall delay imposed on a short code transmitted by a BTS will be the same. This means that, when the path delay is at a minimum (i.e., the path between the BTS and subscriber unit is relatively short), the variable delay value will be at a maximum. On the other hand, when the path delay is at a maximum (i.e., the path between the BTS and subscriber unit is relatively long), the variable delay value will be at a minimum.

Figure 11:
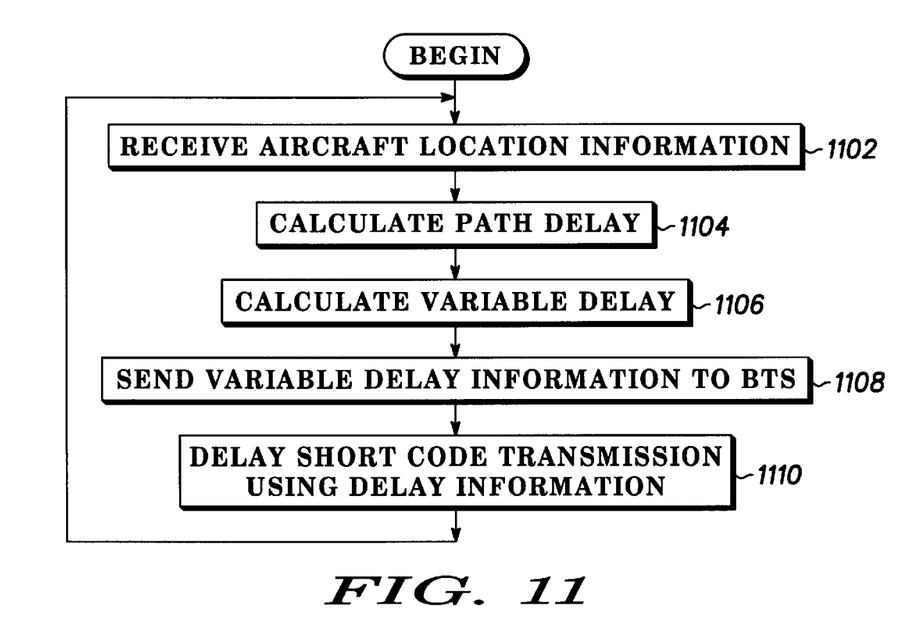
FIG. 11 illustrates a flowchart of a method for calculating and applying a variable delay to a short code, in accordance with one embodiment of the present invention.

FIG. 11 illustrates a flowchart of a method for calculating and applying a variable delay, in accordance with one embodiment of the present invention. The method begins, in block 1102, when the control center receives information that indicates the aircraft's current or future location. This information could originate from the aircraft (e.g., in a telemetry message transmitted from the aircraft to the ground), or could originate from some other source that tracks the aircraft location.

From the aircraft location, the control center calculates the path delay between the BTS and the ground, in block 1104. This calculation can be performed for each aircraft-provided cell, in one embodiment, or an average path delay can be calculated, in another embodiment.

The control center then calculates the variable delay, in block 1106, by subtracting the path delay from the pre-defined constant. The variable delay could be represented in fractions of seconds, in clock cycles, or in some other manner in various embodiments.

In block 1108, the variable delay information is sent to the BTS. In one embodiment, the information is sent only if it has changed from the last variable delay sent to the BTS. In another embodiment, the information is sent each time it is calculated. The BTS then uses the variable delay information, in block 1110, to delay its short code transmission, and the method iterates as shown in FIG. 11.

Figure 12:
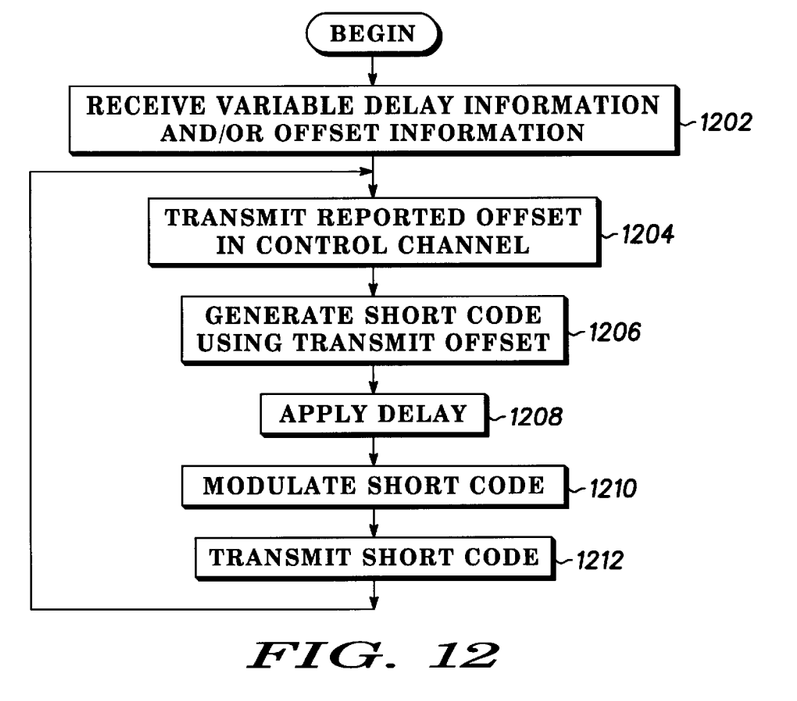
FIG. 12 illustrates a flowchart of a method for a BTS to transmit a short code over a pilot channel, in accordance with one embodiment of the present invention.

FIG. 12 illustrates a flowchart of a method for a BTS to transmit a short code over a pilot channel, in accordance with one embodiment of the present invention. The method begins, in block 1202, when the BTS receives variable delay information and/or information identifying the short code transmit offset and reported offset. As described previously in conjunction with FIG. 11, the variable delay information indicates how much delay the BTS should impose on its short code to keep the total path delay equal to a pre-defined constant value. Also, as described previously in conjunction with FIG. 7, the information identifying the short code transmit offset and reported offset could take the form of a transmit offset number, a delta value, a handoff candidate list, and/or some other type of information.

In block 1204, the BTS transmits the reported offset in its control channel. In one embodiment, this is done by transmitting the handoff candidate list in the control channel. By transmitting the reported offset to the subscriber units, the BTS indicates when the subscriber unit should search for short codes for all BTS's to which the subscriber unit may hand off.

In block 1206, the BTS generates its short code using the transmit offset. As mentioned previously, the transmit offset is equal to or earlier than the reported offset, and the delta between the offsets depends on the path length. In this manner, any subscriber unit that is searching for the BTS' short code should receive the short code within the reported offset search window.

In block 1208, the BTS applies a variable delay to the generated short code in order to compensate for path length deviations that occur along the aircraft's flight pattern. In one embodiment, this is accomplished by queuing the short code bits in a buffer, and regulating the time it takes for the bits to be read out of the buffer and provided to the BTS' modulator. This embodiment will be described in more detail, below.

The short code is then modulated, in block 1210, and transmitted over the pilot channel, in block 1212. The method then iterates as shown, as the BTS continues to send the reported offset and to generate, delay, modulate, and transmit the short code using the received information until new variable delay and/or offset information is received from the control center.

In the embodiment illustrated in FIG. 12, the two techniques of using a variable delay and using different transmit and reported offsets are used together. In other embodiments, only one, but not both techniques, are used to compensate for path delays and variations in path delay due to an aircraft's flight pattern.

Figure 13:
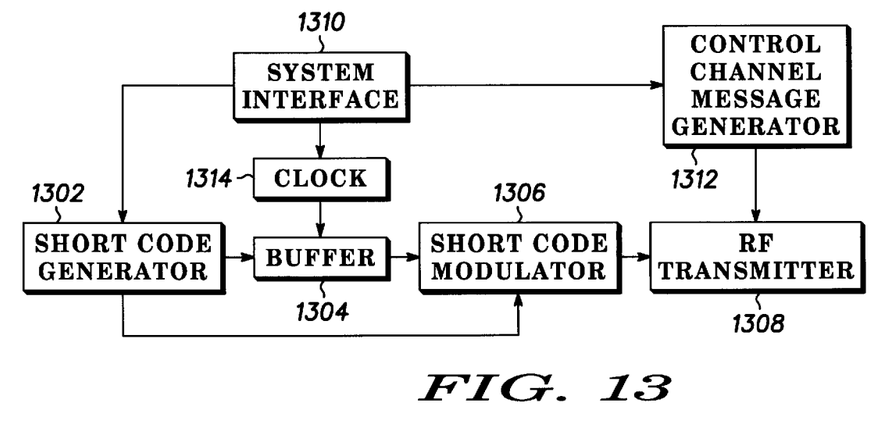
FIG. 13 illustrates a simplified block diagram of a BTS, in accordance with one embodiment of the present invention.

FIG. 13 illustrates a simplified block diagram of a BTS, in accordance with one embodiment of the present invention. In one embodiment, the BTS includes a short code generator 1302, short code modulator 1306, RF transmitter 1308, system interface 1310, and control channel message generator 1312.

System interface 1310 receives control messages from a control center. These control messages include offset information, in one embodiment. The offset information indicates a transmit offset, at which the BTS should transmit its short code, and a reported offset, which the BTS should report to the subscriber units. Control channel message generator 1312 generates a message that includes the reported offset information, in one embodiment, and that information is sent to the subscriber units over the control channel, via RF transmitter 1308. In one embodiment, the reported offset information is in the form of a handoff candidate list.

Short code generator 1302 uses the offset information to determine during which offset (i.e., the transmit offset) it should start to generate its short code. At the appropriate transmit offset, short code generator 1302 generates the short code. In one embodiment, the short code is then modulated by short code modulator 1306 and transmitted by RF transmitter 1308.

In another embodiment, the BTS also includes buffer 1304 and output clock 1314. Buffer 1304 is used to impose a variable delay to the generated short code. In one embodiment, buffer 1304 is a variable length, first-in, first-out (FIFO) buffer. Accordingly, the number of bits in the buffer determines how fast any particular bit will be clocked through the buffer. Thus, the number of bits in the buffer defines the delay imposed on that bit.

In one embodiment, the frequency of the output clock 1314 is modified based on the variable delay information received over system interface 1310. When the variable delay information indicates that delay is to be increased, the clock frequency is decreased to allow more bits to accumulate in the buffer. By accumulating more bits, the amount of time for any one bit to be clocked out of the buffer increases. When the variable delay information indicates that the delay is to be decreased, the clock frequency is increased to reduce the number of bits in the buffer. By reducing the number of bits in the buffer, the amount of time for any one bit to be clocked out of the buffer decreases. Numerous other methods for delaying the generated short code bits could be implemented, in other embodiments, as would be obvious to one of skill in the art based on the description herein.

In the foregoing detailed description, reference is made to the accompanying drawings, which form a part hereof, and in which are shown by way of illustration specific embodiments in which the invention may be practiced. These embodiments are described in sufficient detail to enable those skilled in the art to practice the invention. The foregoing detailed description uses terms that are provided in order to make the detailed description more easily understandable. It is to be understood that these terms and the phraseology employed in the description should not be construed to limit the scope of the invention.

It will be understood by those skilled in the art that the operations of the methods shown and described herein can be carried out in a different order than those described with reference to the FIGS. It will also be understood that while certain flowcharts have "Begin" and "End" blocks, in general the methods that they depict are continuously performed.

It will be further understood that the block diagrams illustrated in the FIGS. are merely representational and are not drawn to scale. Certain proportions thereof may be exaggerated, while others may be minimized. The FIGS. are intended to illustrate various implementations of the invention, which can be understood and appropriately carried out by those of ordinary skill in the art.

It will be appreciated by those of ordinary skill in the art that any arrangement, which is calculated to achieve the same purpose, may be substituted for the specific embodiment shown. For example, although the description refers to implementing various functions of the present invention in particular network elements, many of these functions could be moved to other elements. For example, some or all of the control center functions could be moved into the terrestrial cellular network's OMC, MSO, BTS, and/or ART or into the aircraft payload or AFMS. In addition, some or all of the functions performed by the OMC could be performed by the aero control center, and vice versa. Also, some of the path length and offset calculations performed by the control center could be calculated by the aircraft or MSO. In addition, although the description refers to transmission of the short code over the pilot channel, the present invention could be applied to transmission of any PN code of any length or to transmission of other known data over the pilot channel, control channel, data channel, or other channel. Finally, although the present invention is described to be implemented in a system that uses aircraft as transceivers, it could also be implemented when direct links are used between the BTS's and subscriber units, or when other facilities (e.g., repeater towers or other fixed or mobile repeaters or regenerators) are interjected in the path between the BTS's and subscriber units.

This application is intended to cover any adaptations or variations of the present invention that fall within its scope. The foregoing detailed description, therefore, is not to be taken in a limiting sense, and it will be readily understood by those skilled in the art that various changes in the details, materials, and arrangements of the parts and operations which have been described and illustrated in order to explain the nature of this invention may be made without departing from the spirit and scope of the invention as expressed in the adjoining claims.

What is claimed is:

1. A method for controlling transmission of a pseudo noise (PN) code in a code division multiple access (CDMA) communication system, which includes at least one base transceiver station (BTS) and at least one subscriber unit, the method comprising:

transmitting, by a first BTS, data representing a first offset that indicates a time when a subscriber unit should search for a PN code in a signal transmitted by a second BTS;

generating the PN code, by the second BTS;

transmitting, by the second BTS, a modulated signal that includes the PN code at a time specified by a second offset, wherein the second offset specifies a different time than the first offset;

delaying modulation and transmission of the PN code by a delay time, wherein the delay time is based on a time-varying path length of a communication path between the second BTS and the subscriber unit; and storing the PN code in a buffer prior to the modulation and transmission, and wherein delaying comprises altering a number of PN code bits in the buffer.

2. The method as claimed in claim 1, wherein transmitting the modulated signal comprises periodically transmitting a modulated short code at times specified by the second offset.

3. The method as claimed in claim 1, wherein the time specified by the second offset is earlier than a time specified by the first offset by a value of delta, and the delta is a function of a path length of a communication path between the second BTS and the subscriber unit.

4. The method as claimed in claim 3, wherein the communication path includes an aircraft that relays the modulated signal between the second BTS and the subscriber unit, and the path length equals about a sum of a length of a first link between the second BTS and the aircraft and a length of a second link between the aircraft and the ground.

5. The method as claimed in claim 4, wherein the aircraft attempts to follow a flight pattern, and the delta changes periodically with time based on a position of the aircraft along the flight pattern.

6. The method as claimed in claim 1, wherein transmitting the data comprises transmitting a handoff candidate list to the subscriber unit, wherein the handoff candidate list indicates first offsets for one or more candidate BTS's, including the second BTS, to which the subscriber unit may be able to hand off, and the one or more BTS's transmit modulated PN codes at times specified by second offsets that are different from times specified by the first offsets.

7. The method as claimed in claim 1, wherein delaying modulation and transmission comprises:

changing a frequency of a clock that regulates a time at which bits of the PN code are provided to a modulator.

8. A method for controlling transmission of a pseudo noise (PN) code in a code division multiple access (CDMA) communication system, which includes at least one base transceiver station (BTS) and at least one subscriber unit, the method comprising:

identifying areas where cells provided by multiple BTS's overlap;

determining a first offset, which indicates a time when a subscriber unit should search for a PN code transmitted by a first BTS, so that a PN code transmitted by the first BTS at a time specified by the first offset will not interfere with a PN code transmitted by another BTS;

determining a second offset, which indicates a time at which the first BTS should transmit the PN code, wherein the second offset is different from the first offset; and sending information identifying the second offset to the first BTS.

9. The method as claimed in claim 8, further comprising:

determining additional offsets for additional BTS's so that PN codes transmitted by the additional BTS's will not interfere; and generating a handoff candidate list that correlates the first offset with the first BTS and the additional offsets with the additional BTS's, wherein sending the information comprises sending the handoff candidate list to the first BTS.

10. The method as claimed in claim 8, wherein determining the second offset comprises:

calculating a path length of a communication path between the first BTS and the ground;

calculating a path delay for a signal transmitted along the communication path, based on the path length; and determining the second offset as approximately the first offset minus the path delay.

11. The method as claimed in claim 10, wherein the communication path includes an aircraft that relays signals between a second BTS and the subscriber unit, and determining the path length comprises calculating a sum of a length of a first link between the second BTS and the aircraft and a length of a second link between the aircraft and the ground.

12. The method as claimed in claim 10, wherein the path delay changes based on a location of the aircraft along a flight pattern, the method further comprising:

calculating a delay that the first BTS should impose on the PN code before transmitting the PN code to the subscriber unit; and sending information identifying the delay to the first BTS.

13. A base transceiver station (BTS) of a code division multiple access (CDMA) communication system, the BTS comprising:

a pseudo noise (PN) code generator that generates a PN code at a time specified by a first offset, wherein the PN code includes multiple bits;

a modulator that modulates the multiple bits into a modulated signal;

a radio frequency (RF) transmitter, coupled to the modulator, that transmits the modulated signal to a subscriber unit, wherein the subscriber unit has been informed to search for the PN code at a time specified by a second offset, and wherein the second offset is different from the first offset;

the RF transmitter transmits the modulated signal to the subscriber unit via an aircraft that relays the modulated signal to the subscriber unit, and wherein a delta between the first offset and the second offset is based on a path delay corresponding to a path length of a path between the BTS and the aircraft and a path length of a path between the aircraft and the subscriber unit.

14. The BTS as claimed in claim 13, further comprising:

a buffer for storing the multiple bits prior to modulating the multiple bits, effectively delaying modulation and transmission of the PN code by a delay time, wherein the delay time is based on a time-varying path length of a communication path between the second BTS and the subscriber unit.

15. The BTS as claimed in claim 14, further comprising:

a clock that regulates times at which bits of the PN code are provided to the modulator.

16. The BTS as claimed in claim 13, further comprising:

a system interface that receives information identifying the first offset from a control center.

* * * * *